United States Patent
Goldman

(10) Patent No.: US 6,805,077 B2
(45) Date of Patent: Oct. 19, 2004

(54) COLLAPSIBLE DOG TOY

(75) Inventor: Michael J. Goldman, Mt. Laurel, NJ (US)

(73) Assignee: Tucker Toys Inc., Voorhees, NJ (US)

( * ) Notice: Subject to any disclaimer, the term of this patent is extended or adjusted under 35 U.S.C. 154(b) by 0 days.

(21) Appl. No.: 10/373,356

(22) Filed: Feb. 25, 2003

(65) Prior Publication Data

US 2004/0163610 A1 Aug. 26, 2004

(51) Int. Cl.$^7$ ............................................. A01K 29/00
(52) U.S. Cl. ........................................................ 119/707
(58) Field of Search ................................ 119/707, 702; 446/183, 320, 478, 487, 373, 375, 486, 365; D21/412, 443, 498

(56) References Cited

U.S. PATENT DOCUMENTS

| | | | |
|---|---|---|---|
| 1,653,327 A | * 12/1927 | Wilson | 446/320 |
| 1,660,735 A | * 2/1928 | Wilson | 446/320 |
| 2,952,460 A | 9/1960 | Ellis | |
| 2,968,121 A | 1/1961 | Pearson et al. | |
| 3,113,396 A | 12/1963 | Collins | |
| 3,758,985 A | 9/1973 | Heisler | |
| 3,977,683 A | * 8/1976 | Tomura | 273/155 |
| 4,135,325 A | 1/1979 | Lehman | |
| 4,196,882 A | 4/1980 | Rognon | |
| 4,274,222 A | * 6/1981 | Zahn et al. | 446/126 |
| 4,425,929 A | * 1/1984 | Von Mosshaim | 135/132 |
| 4,607,875 A | 8/1986 | McGirr | |
| 4,790,714 A | 12/1988 | Nishino et al. | |
| 4,794,024 A | 12/1988 | Crowell et al. | |
| 4,955,841 A | 9/1990 | Pastrano | |
| 5,090,569 A | 2/1992 | Nissen et al. | |
| 5,096,751 A | 3/1992 | Duchek | |
| 5,123,869 A | 6/1992 | Schipmann | |
| 5,263,760 A | 11/1993 | Sohol | |
| 5,381,990 A | 1/1995 | Belokin et al. | |
| 5,511,752 A | 4/1996 | Trethewey | |
| 5,797,815 A | 8/1998 | Goldman et al. | |
| 5,934,966 A | 8/1999 | Ward | |
| 6,089,247 A | * 7/2000 | Price | 135/145 |
| 6,237,538 B1 | * 5/2001 | Tsengas | 119/707 |
| 6,282,849 B1 | * 9/2001 | Tuczek | 52/81.1 |
| 6,622,659 B2 | * 9/2003 | Willinger | 119/702 |

* cited by examiner

Primary Examiner—Son T Nguyen
(74) Attorney, Agent, or Firm—Norman E. Lehrer

(57) ABSTRACT

A dog toy that includes a three-dimensional shell structure with a top end and a bottom end with four hinged arms extending between and connecting the top end to the bottom end is disclosed. A fabric cover is loosely secured to the structure making it look like a ball. Elastic members are connected to the arms and are used to bias the structure into the shape of a ball. A suction cup is secured to the top end and a platform is secured to the bottom end so that when the structure is collapsed, the suction cup grips the platform and keeps the ends together. In the flattened state, the structure may be easily thrown by a person. When the suction force is released, the structure regains its three dimensional shape. A dog may now be able to grip the structure and retrieve it.

4 Claims, 3 Drawing Sheets

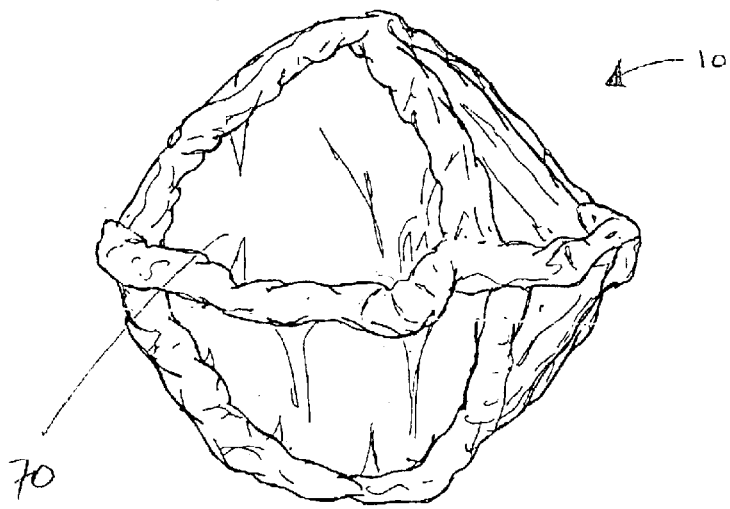
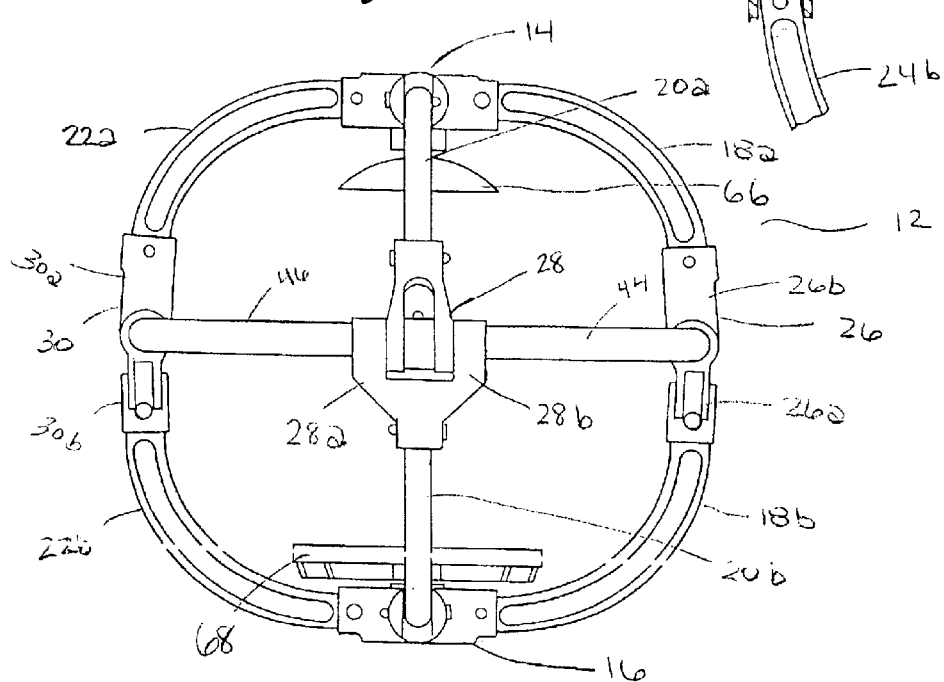

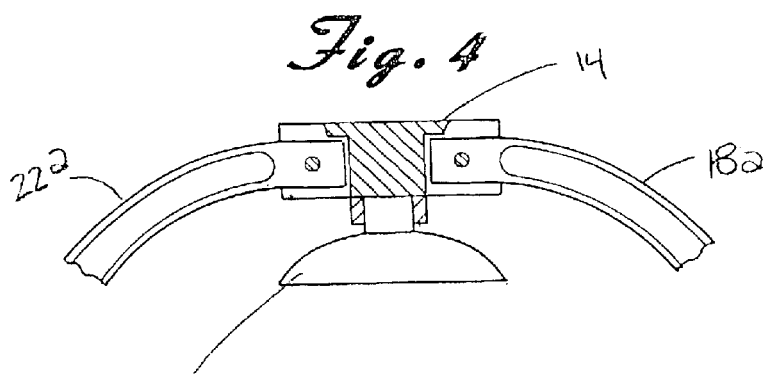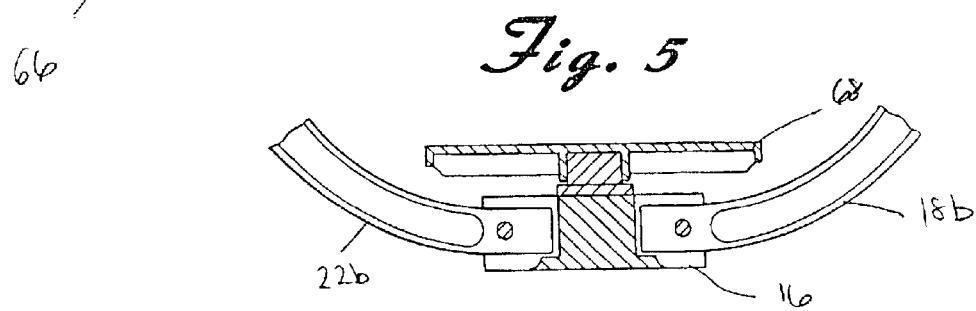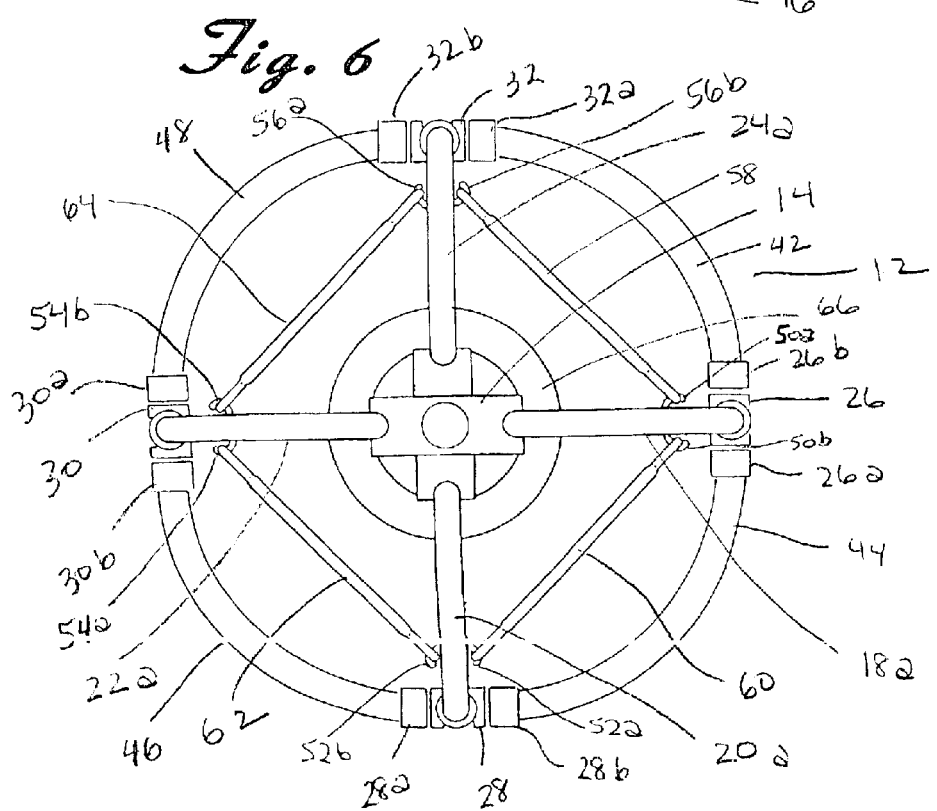

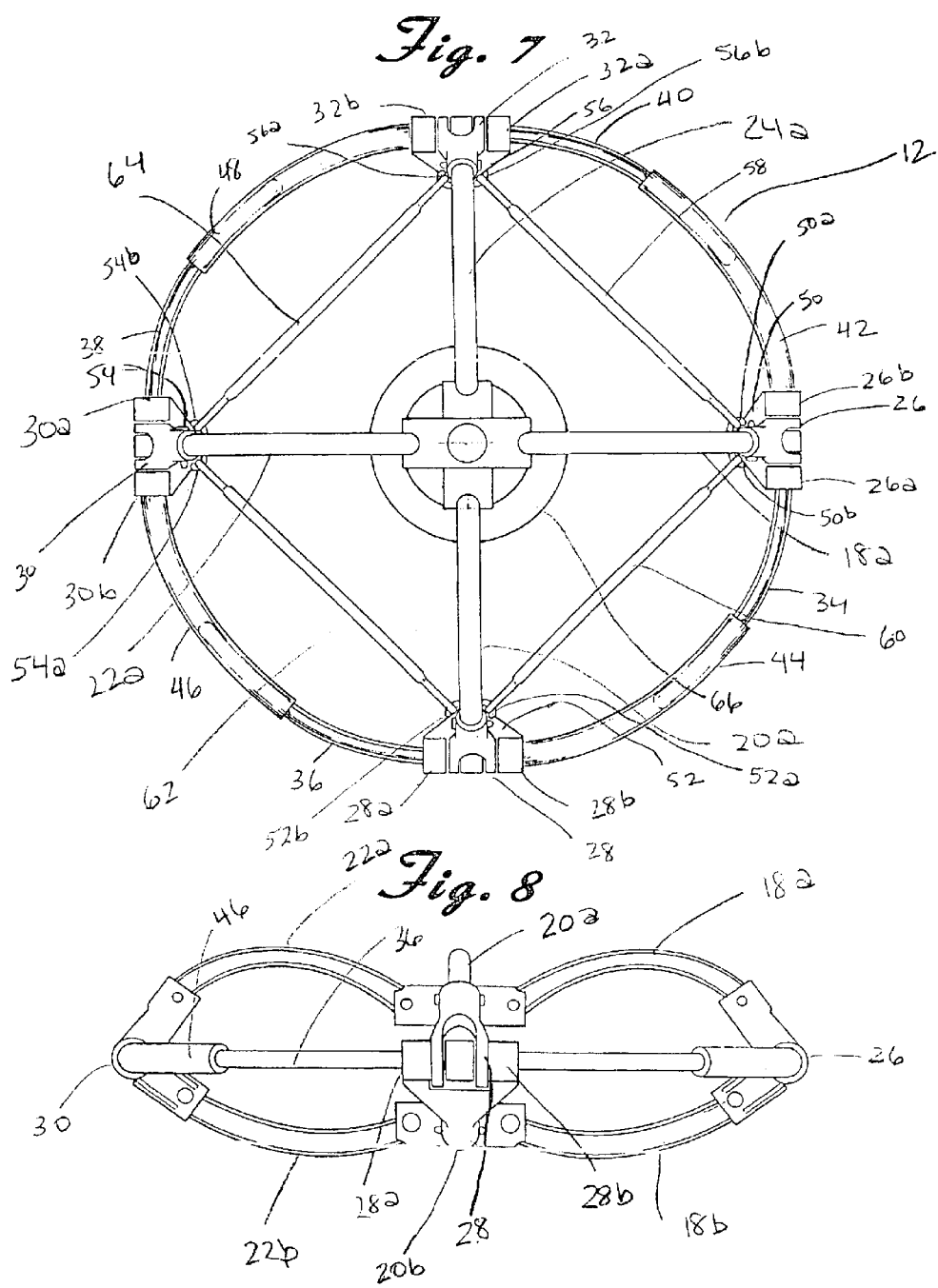

COLLAPSIBLE DOG TOY

BACKGROUND OF THE INVENTION

The present invention is directed toward a dog toy and more particularly, toward a dog toy that can be collapsed and thrown and can then spring back to a three-dimensional state for easy retrieval by a dog.

Dogs enjoy retrieving various types of objects such as sticks, balls, flying discs, and the like. Using a flying disc enhances the enjoyment that a dog has in "playing fetch." Typically, the flying disc is made from a plastic material. The disc has an outer side with a generally smooth surface and an underside that has a rim extending along the periphery of the disc. The rim is raised from the rest of the disc so that the dog may easily grip the rim between its jaws.

A problem may occur, however, when the dog seeks to retrieve the disc in that the disc may not always be easily gripped by the dog. That is, if the disc lands with the underside facing upwardly, the rim is exposed which the dog may grip with its teeth. If the disc lands with the underside facing downwardly, the dog may have some difficulty in grasping the smooth side of the disc with its teeth. Therefore, the dog may not be able to retrieve the disc, thereby decreasing the enjoyment of the game by both the person throwing the disc as well as the dog.

In order to alleviate this problem, discs have been introduced that include some type of gripping member secured or otherwise mounted to the disc so that the dog may be able to grip the disc by the gripping member regardless of the orientation of the disc when it lands. These types of discs, however, effect drag and may not allow for optimum flight characteristics.

Other discs have been introduced that are made from a foam type of material or a fabric. A problem inherent with these types of discs is that foam is not a very durable material so that the life of the disc may be shortened as the disc is continuously gripped and retrieved by the dog with its jaws.

Therefore, a need exists for a durable dog toy that is enjoyable to both the person and the dog playing with the toy in that the toy can be thrown easily by the person and then can be easily gripped by the dog.

SUMMARY OF THE INVENTION

The present invention is designed to overcome the deficiencies of the prior art discussed above. It is an object of the present invention to provide a dog toy that may be collapsed and thrown.

It is another object of the present invention to provide a dog toy that regains its three-dimensional shape after it has been thrown.

It is a further object of the present invention to provide a toy for a dog that can be gripped easily by the dog.

In accordance with the illustrative embodiments demonstrating features and advantages of the present invention, there is provided a dog toy including a three-dimensional, generally spherical shell structure with a top end and a bottom end. At least four hinged arms extend between and connect to the top end and the bottom end. A fabric cover is loosely secured to the shell structure and covers it, making it look like a ball. Biasing means connected to each of the arms are used to urge the arms into a position to form a ball. However, a force can be applied by the user so that the shell structure can be forced into a flattened, collapsed state. A suction cup is secured to the top end and a platform is secured to the bottom end so that when the shell structure is collapsed, the suction cup grips the platform and keeps the ends together. In the flattened state, the structure may be easily thrown by a person. When the suction force is released, the shell structure regains its three-dimensional shape. A dog may now be able to grip the structure with its mouth and retrieve it.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front perspective view of the toy of the present invention with a fabric cover;

FIG. 2 is a front perspective view of the toy of the present invention similar to FIG. 1 but without the cover;

FIG. 3 is a partial cross-sectional view of an elastic band attached to a hinge of the toy of the present invention;

FIG. 4 is a partial cross-sectional view of the suction cup attached to the top end of the toy of the present invention;

FIG. 5 is a partial cross-sectional view of the planar member attached to the bottom end of the toy of the present invention;

FIG. 6 is a top perspective view of the toy of the present invention in its normal, three-dimensional state;

FIG. 7 is a top perspective view of the toy of the present invention in its expanded state; and FIG. 8 is a side elevational view of the toy of the present invention as shown in FIG. 7.

DETAILED DESCRIPTION OF THE PREFERRED EMBODIMENT

Referring now to the drawings in detail wherein like reference numerals have been used throughout the various figures to designate like elements, there is shown in FIG. 1 a collapsible dog toy constructed in accordance with the principles of the present invention and designated generally as 10.

The present invention essentially includes a dog toy including a generally spherical, ball-like, three-dimensional shell or frame structure 12. (See FIG. 2.) The shell structure 12 is composed of a top end 14, a bottom end 16, and at least four hinged arms extending between and pivotally connecting to the top end 14 and the bottom end 16. Each arm includes a top section 18a, 20a, 22a, and 24a, a bottom section 18b, 20b, 22b, and 24b, and a hinge 26, 28, 30, and 32, respectively, connecting the two sections. Extending outwardly from the left side 26a, 28a, 30a, and 32a of each hinge 26, 28, 30, and 32, respectively, is an elongated curved member 34, 36, 38, and 40 and extending outwardly from the right side 26b, 28b, 30b, and 32b of each hinge 26, 28, 30, and 32, respectively, is a hollow tubular curved member 42, 44, 46, and 48. Each elongated member 34, 36, 38, and 40 telescopes within the adjacent hollow tubular member 44, 46, 48, and 42 extending from their respective hinges 26, 28, 30 and 32. (See FIG. 7.) In this manner the elongated members and tubular members follow the circumference of the shell structure and connect the arms together.

A hook member 50, 52, 54, and 56 extends from a respective hinge 26, 28, 30, and 32 towards the center of the shell structure 12. Each hook member 50, 52, 54, and 56 includes two hooks 50a, 50b, 52a, 52b, 54a, 54b, 56a, and 56b, respectively. Biasing means, such as elastomeric bands 58, 60, 62, and 64, are secured to each hook so that a band extends between and is secured to adjacent hooks. (See FIG. 6.) For example, band 64 is secured to hook 56a of hook member 56 and hook 54b of hook member 54. (See FIG. 7.) The biasing means are used to urge the mid portions of the arms inwardly and the upper and lower ends outwardly so that the shell structure is forced into an open ball like structure. While elastomeric bands are the presently preferred biasing means it should be readily apparent that other means such as coil springs or the like could be used.

A suction cup 66 is secured to the top end 14, facing the center of the shell structure 12 and a planar member 68 in the form of a platform is secured to the bottom end 16 also facing the center of the shell structure. (See FIGS. 2, 4 and 5.) This is also by way of a preferred embodiment as other means such as Velcro or similar fasteners may be used to temporarily hold the two ends together. The shell structure may be formed from a plastic or similar type of material. A fabric cover 70 is loosely secured to the shell structure 12 and encloses it so that the structure resembles a ball. (See FIG. 1.) The fabric is preferably made of a tough nylon or similar material and is stitched or otherwise loosely connected to the arms and perimeter members. In this way, a dog can easily grasp a portion of the device in its jaw. The term fabric is not intended to be limited to wovens but could include substantially any flexible sheet-like material that will function in the desired manner.

In order to use the device of the present invention, force is applied to the top end 14 of the structure 12 so that the structure 12 is forced downwardly. The biasing means 58, 60, 62, and 64 urge the arms outwardly. The tubular members 42, 44, 46, and 48 are also forced to move outwardly so that the elongated members 34, 36, 38, and 40 normally residing within their respective tubular members 44, 46, 48, and 42 are exposed. (See FIG. 7.) This action aids in producing a collapsed, flattened state. (See FIG. 8.) The suction cup 66 meets the platform 68 located on the bottom end 16 of the structure 12 and grips or adheres to the platform 68. The structure may now be thrown in a manner similar to a flying disc.

Once the suction force is released from the platform 68, either through the passage of time or a force being applied thereto, the shell structure 12 resumes its original three-dimensional state. That is, the biasing means 58, 60, 62, and 64 are no longer stretched out and the elongated members 34, 36, 38, and 40 retract into their respective tubular members 44, 46, 48, and 42. The structure may now be easily gripped by a dog for retrieval.

The present invention may be embodied in other specific forms without departing from the spirit or essential attributes thereof and accordingly, reference should be made to the appended claims rather than to the foregoing specification as indicating the scope of the invention.

I claim:

1. A collapsible dog toy comprising:

a shell structure having a top end, a bottom end, and a plurality of hinged arms connecting said top end and said bottom end so as to alternately form a generally spherical shape or a substantially disc shape;

each of said arms having a top section, a bottom section, and a hinge, each of said hinges connecting a top section with its respective bottom section and each of said hinges having a left side and a right side;

means for biasing said structure into said generally spherical shape;

means mounted to said top end and to said bottom end for temporarily holding said ends together;

a fabric cover loosely enclosing said structure; and a hollow tubular member attached to the right side of each of said hinges and an elongated member attached to the left side of each of said hinges so that each elongated member telescopingly fits within an adjacent tubular member, wherein said shell structure is collapsed when a force is applied to said top end such that said arms are forced outwardly and said temporary holding means temporarily hold said top and bottom ends together whereby said structure assumes a disc shape which can be thrown.

2. The collapsible dog toy of claim 1 wherein said means for temporarily holding said top and bottom ends together includes a suction cup mounted to said top end and a planar member mounted to said bottom end.

3. The collapsible dog toy of claim 2 wherein said shell structure resumes its generally spherical shape when the suction force of said suction cup is released from said planar member.

4. The collapsible dog toy of claim 1 wherein sad biasing means are elastomeric bands.

\* \* \* \* \*